(12) United States Patent
Ritamäki et al.

(10) Patent No.: US 9,858,521 B2
(45) Date of Patent: Jan. 2, 2018

(54) RFID TRANSPONDER AND RFID TRANSPONDER WEB

(71) Applicant: Confidex OY, Tampere (FI)

(72) Inventors: Matti Ritamäki, Siuro (FI); Heikki Ahokas, Tampere (FI); Miika Pylvänäinen, Ylöjärvi (FI)

(73) Assignee: Confidex OY, Tampere (FI)

( * ) Notice: Subject to any disclaimer, the term of this patent is extended or adjusted under 35 U.S.C. 154(b) by 0 days.

(21) Appl. No.: 15/518,425

(22) PCT Filed: Oct. 14, 2014

(86) PCT No.: PCT/FI2014/050779
§ 371 (c)(1),
(2) Date: Apr. 11, 2017

(87) PCT Pub. No.: WO2016/059285
PCT Pub. Date: Apr. 21, 2016

(65) Prior Publication Data
US 2017/0316299 A1    Nov. 2, 2017

(51) Int. Cl.
*G06K 19/077* (2006.01)
*H01Q 1/22* (2006.01)
*H01Q 1/48* (2006.01)
*H04B 5/00* (2006.01)

(52) U.S. Cl.
CPC . *G06K 19/07718* (2013.01); *G06K 19/07749* (2013.01); *H01Q 1/2225* (2013.01); *H01Q 1/48* (2013.01); *H04B 5/0062* (2013.01)

(58) Field of Classification Search
CPC ........... G06K 7/10366; G06K 7/10009; G06K 7/10316; G06K 19/0723; G06K 7/10356; G06K 19/0717; G06K 7/0008
USPC ....................................................... 340/10.1
See application file for complete search history.

(56) References Cited

U.S. PATENT DOCUMENTS

| 6,215,402 | B1* | 4/2001 | Rao Kodukula | .... G06K 7/0008 340/572.7 |
| 7,948,384 | B1 | 5/2011 | Kennedy | |
| 8,254,833 | B2* | 8/2012 | Tian | ................ G06K 17/0009 235/432 |
| 8,618,937 | B2* | 12/2013 | Rofougaran | ......... H01Q 1/2283 340/572.1 |
| 8,749,390 | B2* | 6/2014 | Eray | .................... H01Q 1/2225 340/572.5 |

(Continued)

FOREIGN PATENT DOCUMENTS

| CN | 201332142 Y | 10/2009 |
| CN | 201532728 U | 7/2010 |

(Continued)

OTHER PUBLICATIONS

International Search Report issued in PCT/FI2014/050779 dated Sep. 3, 2015.

*Primary Examiner* — Mark Blouin
(74) *Attorney, Agent, or Firm* — Jeffrey T. Placker; Holland & Knight LLP

(57) ABSTRACT

An RFID transponder (100), comprising a printable surface (1), an antenna element (2), an IC (3), and a ground plane (4) arranged under the antenna element (2). The ground plane (4) comprises one or more opening(s) (6) through said ground plane (4) for enabling near field communication through the ground plane (4).

14 Claims, 4 Drawing Sheets

(56) References Cited

U.S. PATENT DOCUMENTS

| | | | |
|---|---|---|---|
| 9,722,165 B2 * | 8/2017 | Carr | H01L 35/26 |
| 2005/0021172 A1 | 1/2005 | Winter et al. | |
| 2006/0208901 A1 * | 9/2006 | Kai | G06K 19/07749 |
| | | | 340/572.7 |
| 2007/0216591 A1 | 9/2007 | Tsirline et al. | |
| 2009/0205515 A1 | 8/2009 | Forster et al. | |
| 2012/0019363 A1 | 1/2012 | Fein | |
| 2016/0336198 A1 * | 11/2016 | Singleton | H01L 21/561 |

FOREIGN PATENT DOCUMENTS

| | | |
|---|---|---|
| EP | 1864819 A2 | 12/2007 |
| JP | 2009163327 A | 7/2009 |
| JP | 2010234574 A | 10/2010 |
| WO | 2011007260 A1 | 1/2011 |
| WO | 2013110625 A1 | 8/2013 |
| WO | 2014002437 A1 | 1/2014 |

* cited by examiner

RFID TRANSPONDER AND RFID TRANSPONDER WEB

CROSS-REFERENCE TO RELATED APPLICATIONS

The subject application is a U.S. National Stage application of International Application No. PCT/FI2014/050779, filed on Oct. 14, 2014. The contents of which is incorporated herein by reference in its entirety.

BACKGROUND

The invention relates to an RFID transponder.

The invention further relates to an RFID transponder web.

It is known to code RFID transponders by using RFID printer-encoders. An RFID printer-encoder typically prints visual information like barcode or human readable on top of the RFID transponder. Same or, alternatively, different information is electronically programmed inside the IC memory of the RFID transponder by the reader antenna of the printer.

However, some RFID transponders have structures which may isolate the antenna of the transponder from the radiation of the reader antenna of the printer. Said structure of the RFID transponder is usually the ground plane of the antenna of said transponder. For instance, if the printer has its reader antenna below the ground plane, it is usually not possible to couple the reader antenna to the antenna of the RFID transponder. Therefore the RFID transponder cannot be encoded in said printer.

BRIEF DESCRIPTION

Viewed from a first aspect, there can be provided an RFID transponder, comprising a printable surface, an antenna element, an IC, a ground plane arranged under the antenna element, the ground plane comprising one or more opening(s) through said ground plane for enabling near field communication through the ground plane.

Thereby an RFID transponder which may be encoded in most RFID printers may be achieved.

Viewed from a further aspect, there can be provided an RFID transponder web, comprising a support substrate, and a series of the RFID transponders arranged on said support substrate such that there is a distance between two successive RFID transponders, the transponder(s) having a transponder thickness, and a bridge arranged between the successive RFID transponders, the bridge having a bridge thickness, the transponder thickness and the bridge thickness being equal or at least essentially equal, and wherein the bridge is excluded from completed RFID transponders separated from the RFID transponder web.

Thereby an RFID transponder web which reduces significantly the stresses of the printer head of RFID printer-encoders, RFID encoders, and RFID printers may be achieved.

The RFID transponder and the RFID transponder web are characterised by what is stated in the characterising parts of the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit subtasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment a spacer layer made of a dielectric material is arranged between the antenna element and the ground plane.

In one embodiment the opening is a slot or groove.

In one embodiment the opening has a shape of circle, ellipse or polygon.

In one embodiment at least one of said opening(s) is arranged under an impedance matching element arranged in the antenna element.

In one embodiment at least one of said opening(s) is arranged under a radiating element arranged in the antenna element.

In one embodiment the RFID transponder comprises a secondary antenna, wherein the one or more opening(s) through the ground plane are arranged for enabling near field communication of the secondary antenna through the ground plane.

In one embodiment the width of the bridge is less than the width of the RFID transponder.

In one embodiment the bridge comprises a secondary antenna arranged for near field communication.

In one embodiment the bridge comprises a ground plane, and one or more opening(s) through said ground plane for enabling near field communication of the secondary antenna through the ground plane.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
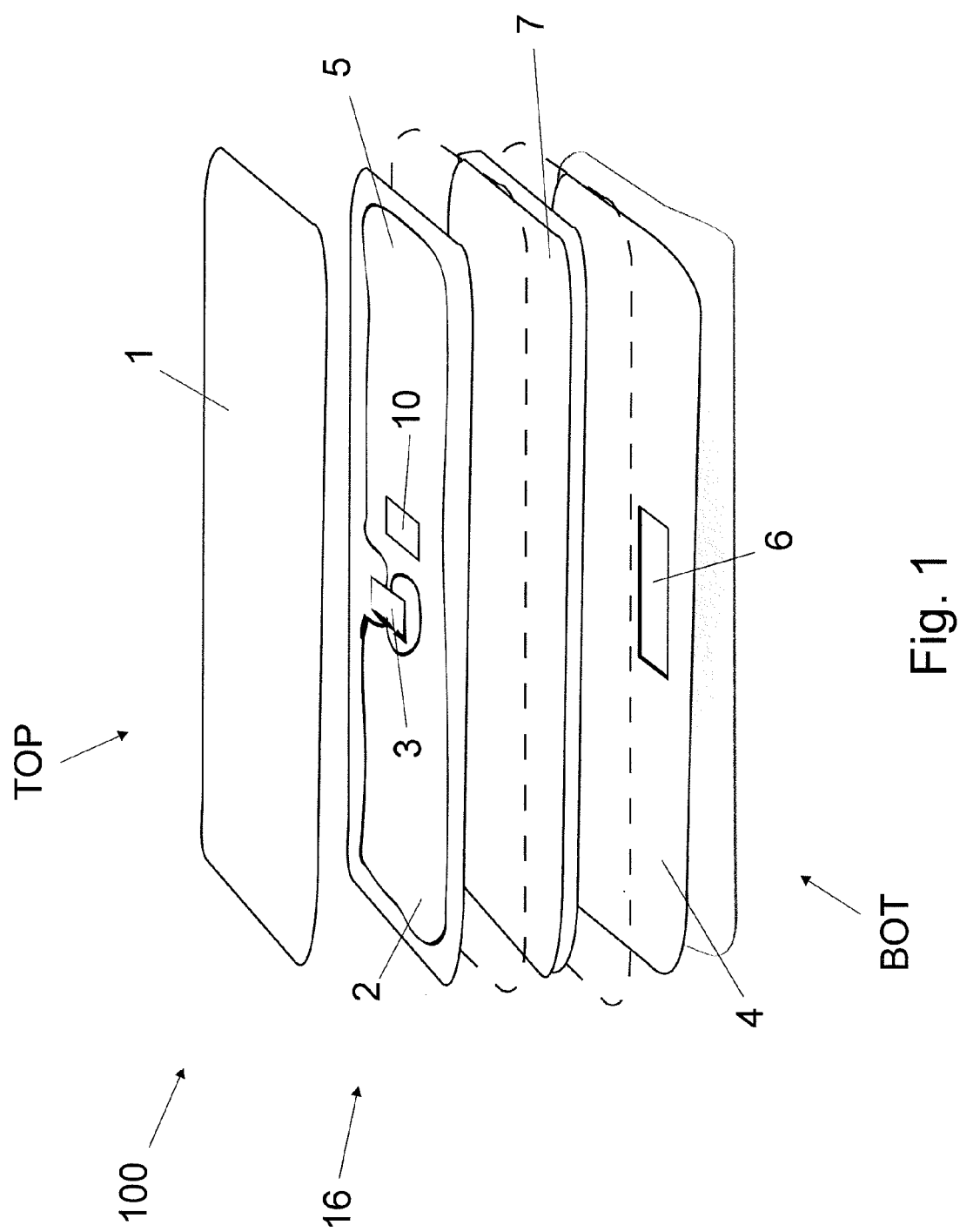
FIG. 1 is a schematic perspective view of an example RFID transponder divided in its layers.

FIG. 1 is a schematic perspective view of an example RFID transponder divided in its layers. The RFID transponder 100 may comprise a printable surface or face element 1, an antenna element 2, an IC 3, and an impedance matching element 10. The RFID transponder 100 further comprises a ground plane 4 arranged under the antenna element 2. Said layers are typically attached together with suitable adhesive layers and sealed by e.g. a silicone liner.

The printable coating 1 is arranged on the top side TOP of the transponder 100. The coating 1 may be a thin material layer manufactured from e.g. paper or plastic based material, or a layer of paint(s) and/or lacquer(s). The antenna element 2 and the IC 3 (together with further electronic components, if any) may be arranged to a structural module such as an inlay 5 comprising a dielectric substrate.

The ground plane 4 comprises at least one opening 6 that extends through the ground plane 4.

The RFID transponder 100 shown in FIG. 1 further comprises a spacer layer 7 that is arranged to make distance between the antenna element 2 and the ground plane 4. The spacer layer 7 is made of a dielectric material, such as polyethylene PE, polypropylene PP polyethylene terephthalate PET, in a solid or a foamed form.

The spacer layer 7 enables the RFID transponder 100 attached to e.g. on a metal surface or a surface made of some other conductive material.

The opening 6 establishes a near field element in the ground plane 4, i.e. it enables near field communication through the ground plane 4. For example, if the reader antenna of an RFID printer-encoder is on the bottom side BOT of the RFID transponder 100, the opening 6 makes it possible to couple e.g. said reader antenna with the antenna element 2 of the transponder, thus enabling encoding the RFID transponder 100 although the reader antenna is situated opposite side of the ground plane 4 compared to the antenna element 2 of the transponder.

Figure 2:
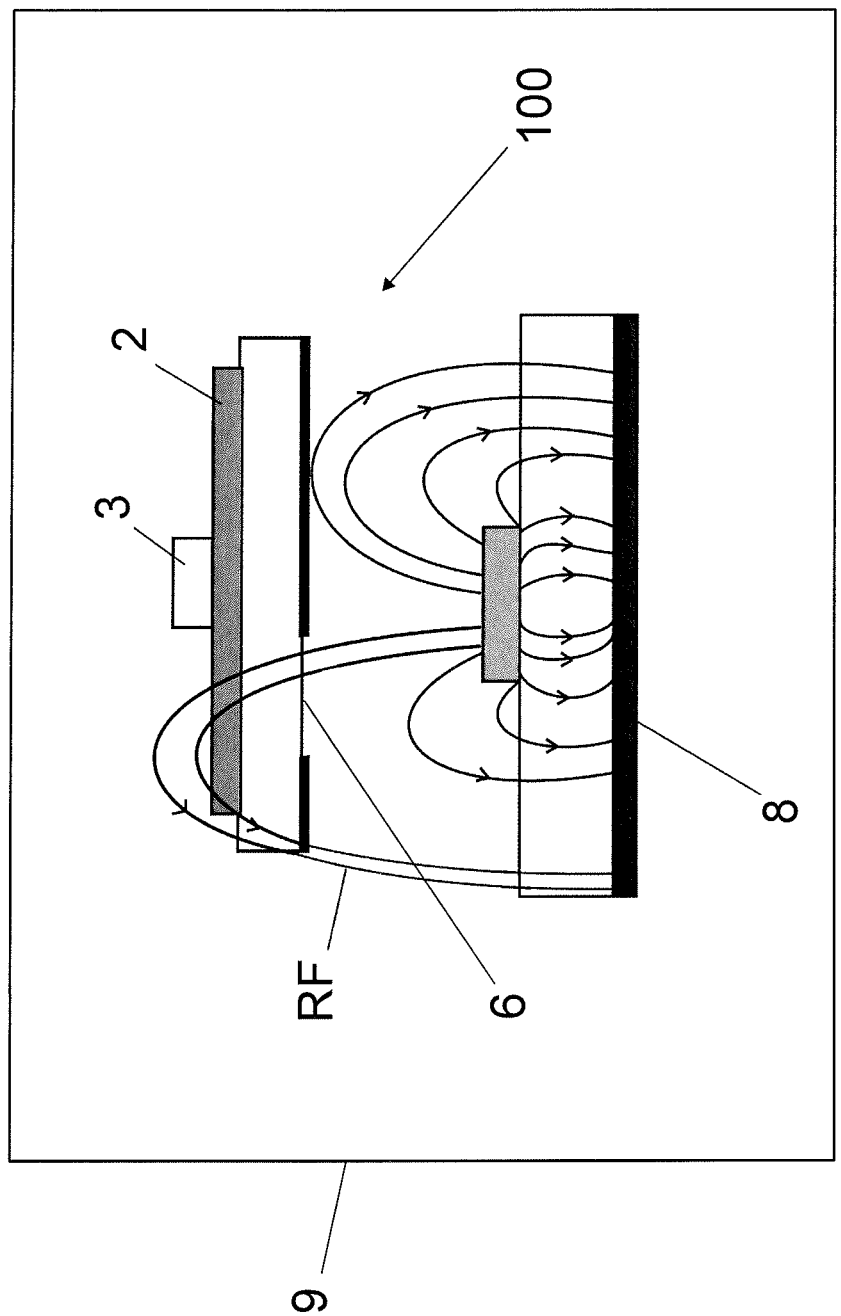
FIG. 2 is a schematic side view of an example RFID transponder shown in a RFID printer.

Some of the advantages of the ground plane 4 comprising at least one opening 6 can be seen in FIG. 2 which is a schematic side view of an example RFID transponder shown in a RFID printer-encoder 9. The RFID printer-encoder 9 may be e.g. Zebra RZ600.

Antennas or couplers 8 of RFID printer-encoders 9 are usually small loop antennas or transmission lines that generate a coupling to the antenna element 2 of the RFID transponder 100. Said transmission line can be waveguide, microstrip, stripline, coaxial or any other suitable type of transmission line. An RF signal traveling inside the antenna or transmission line generates an electromagnetic field. The field is very strong close to said antenna or transmission line, but it does not work as antenna meaning that the signal does not radiate to the far field. Small loop antenna generates strong magnetic field.

FIG. 2 illustrates electric field between a printer antenna 8 and an antenna element 2. The ground plane 4 of the RFID transponder 100 is provided with an opening 6 through which RF signal from the printer antenna 8 may penetrate to the antenna element 2. This means that the opening(s) 6 allow(s) the antenna element 2 to a near field communication inside RFID printer-encoder 9.

On the other hand, the ground plane 4 works as a solid metal plane in the end use application on the object to be tagged.

The ground plane 4 can be part of RFID transponder 100. It is to be noted that a part of the ground plane 4 can be a part of object to be tagged.

Figure 3:
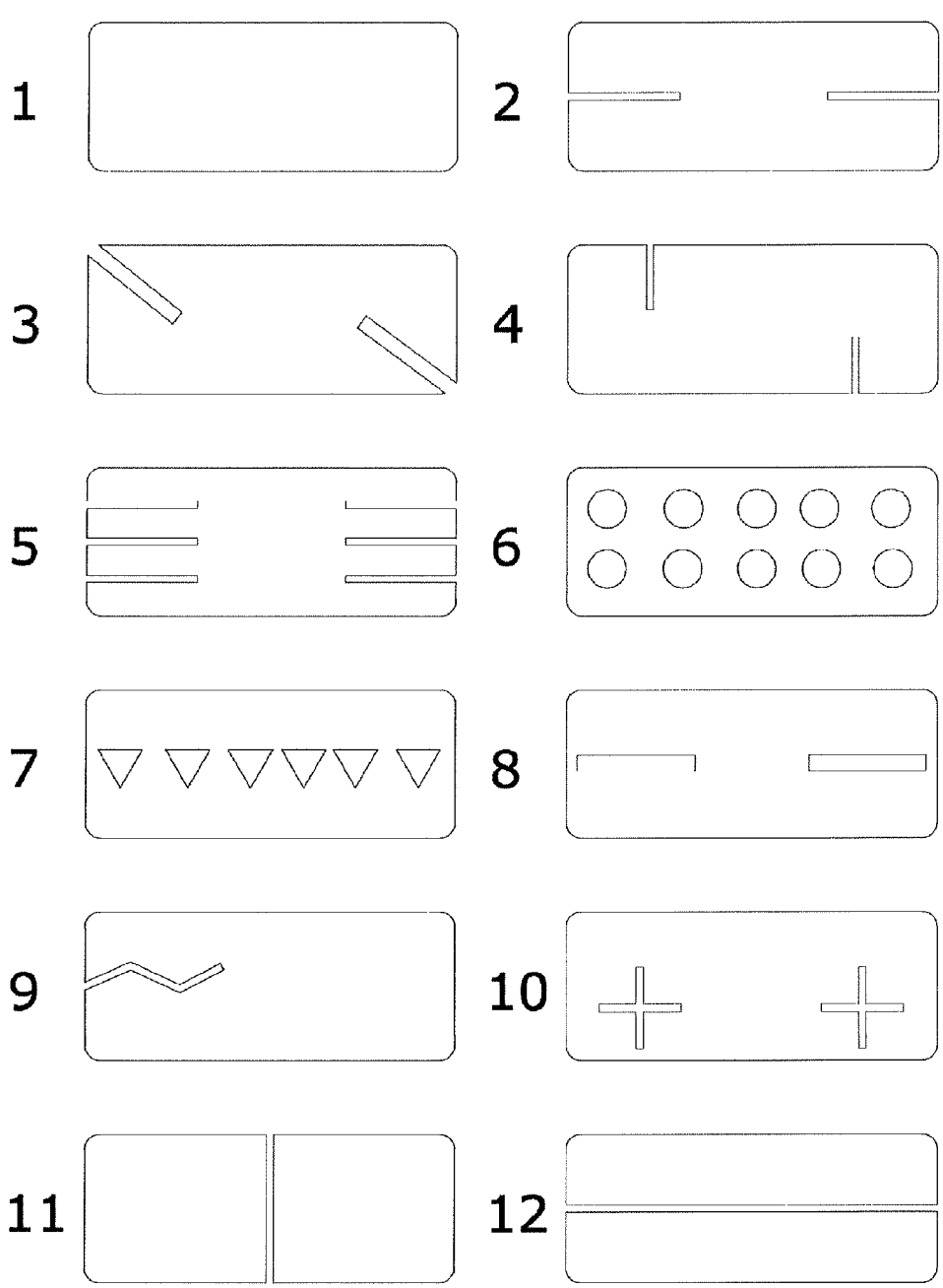
FIG. 3 is a schematic top view of totally twelve example ground planes of RFID transponders.

FIG. 3 is a schematic top view of totally twelve example ground planes of RFID transponders.

Number 1 is showing a ground plane 4 that presents the state of the art. It does not have any openings therein.

Numbers 2 to 12 are showing ground planes 4 according to the invention. That is to say they comprise at least one opening extending through the ground plane 4 for enabling near field communication through the ground plane 4.

The opening 6 may be a slot or a groove, or it may have a shape of circle, ellipse or polygon. The opening 6 may extend to the edge of the ground plane 4. The opening 6 may be arranged longitudinally, perpendicularly and/or diagonally with relation to the ground plane 4. The shapes, combination of differently shaped openings and positions of the opening(s) are designed such a way that an optimal performance is obtained in the encoding process and in the end use of the RFID transponder 100 arranged on a conductive surface or on a non-conductive surface.

Shapes for the ground plane metal can be implemented with die-cutting, laser cutting, printing or etching or any other metallization method.

It is to be noted, that the shape of the ground plane 4 may differ from that shown in the Figures of this description. The shape of the ground plane 4 may be e.g. round, ellipse, polygon etc.

According to an idea, at least one of the opening(s) 6 is arranged under an impedance matching element 10 of the RFID transponder 100. An advantage of this structure is that the coupling between the antenna element 2 of the RFID transponder 100 and the printer-encoder antenna 8 may be enhanced, because the magnetic field created by a printer-encoder antenna penetrates through the impedance matching element.

According to an idea, at least one of the opening(s) 6 is arranged under the radiating element of the antenna element 2. According to another idea, at least one of the opening(s) 6 is not arranged directly under the antenna element, but the opening(s) lie(s) off the antenna element. However, the printer-encoder antenna can be coupled to the antenna part of the RFID transponder 100. The advantage of this structure is a wide variation in the end use applications, because the most sensitive parts of antenna, which is usually the impedance matching element, is protected with a solid parts of the ground plane 4.

Figure 4:
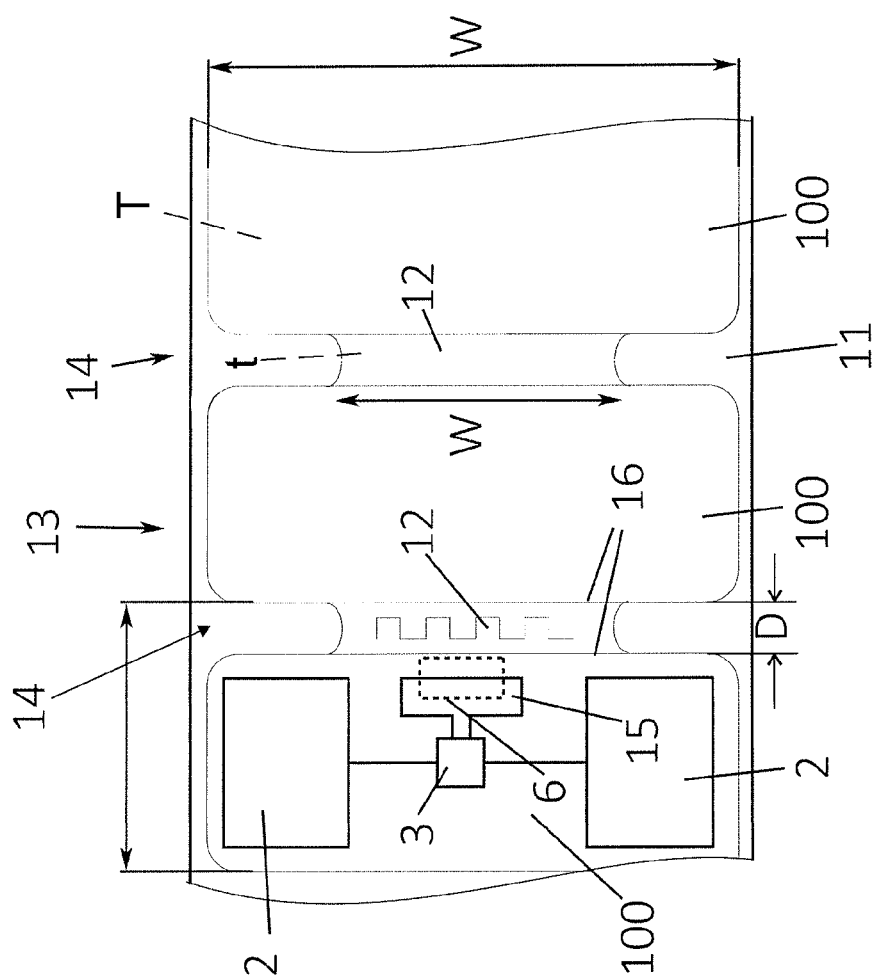
FIG. 4 is a schematic top view of an example RFID label web.

FIG. 4 is a schematic top view of an example RFID transponder web 13.

In order to obtain RFID printer-encoder compatibility, the RFID transponder 100 has to be thin. Most RFID printer-encoders will work with RFID transponders 100 which are less than 1 mm thick. This applies also to RFID encoders, i.e. devices that are used to encode RFID transponders but which do not have printing means, and also to RFID printers, i.e. devices that are able to print RFID transponders but which do not have encoding means.

The RFID transponder web 13 comprises a support substrate 11 and a series of the RFID transponders 100 arranged on said support substrate 11 such that there is a distance D between two successive RFID transponders 100. The transponders have a transponder thickness T represented by a dash line in FIG. 4.

The thickness T of the RFID transponder 100 causes challenges for printer head, because there is a gap 14 between two successive RFID transponders 100. The gap 14 causes significant load for the printer head of the RFID printer-encoder 9. To overcome this issue, the RFID transponder web 13 comprises a bridge 12 arranged between two successive RFID transponders 100. The bridge has a bridge thickness t that is equal or at least essentially equal with the transponder thickness T. The bridge thickness t is represented by a dash line in FIG. 4. The bridge 12 reduces significantly the stresses of the printer head of RFID printer-encoders, RFID encoders, and RFID printers.

The bridge 12 may be manufactured e.g. from a material of a lamination process that normally would be removed from the transponder web 13.

In other words, a piece of so called "waste material" is not removed but left between the RFID transponders 100. The bridge 12 may have any suitable shape.

The bridge 12 is designed such a way that sensors of the RFID printer-encoder 9 are able to detect the edge of the RFID transponders 100.

According to an idea the width w of the bridge 12 is less than the width W of the RFID transponder 100. The sensor types are typically capacitive or optical sensors.

The bridges 12 are detached from the encoded RFID transponders 100.

According to an idea, the RFID transponder 100 comprises a secondary antenna 15 which is adapted for near field communication with, for instance, a RFID printer-encoder or a RFID encoder. The secondary antenna 15 may have a structure of a dipole or loop antenna or any other antenna structure used for RFID transponders. Secondary antenna 15 is connected to the IC 3. The IC 3 may have two antenna ports such that port number one is connected to the primary antenna or the antenna element 2 used for far field communication, whereas port number two is used for near field communication. Alternatively, the IC 3 comprises only one antenna port. In that case the secondary antenna 15 is connected to the primary antenna such a way that it has not significant impact on performance of the primary antenna. Connection of secondary antenna 15 to the IC 3 may be galvanic, inductive or capacitive one. It is to be noted that the components of the RFID transponders 100 and the bridges, if any, are shown only in one transponder and bridge, respectively, for sake of clarity.

Furthermore, the RFID transponder 100 comprises one or more opening(s) 6, shown by dash line, through the ground plane 4 which enables near field communication of the secondary antenna 15 through the ground plane 4 in principle same way as discussed earlier concerning the antenna element 2.

It is to be noted that the secondary antenna 15 arranged in the RFID transponder 100 may also be used in embodiments without the bridge 12.

According to another embodiment, the secondary antenna 15 for near field communication is arranged in the bridge 12. This embodiment is also shown in FIG. 4. It is to be underlined that the secondary antenna 15 is arranged either in the RFID transponder 100 or in the bridge 12, but usually not in both the RFID transponder 100 and the bridge 12. Here again, the connection of secondary antenna 15 to the IC 3 may be galvanic, inductive or capacitive one. Galvanic connection may require that there is a perforation 16 etc. in the galvanic connection line for facilitating the separation of the RFID transponder 100 and the bridge 100 after the encoding.

The bridge 12 may comprise a ground plane 4 and one or more opening(s) 6 through said ground plane 4 for enabling near field communication of the secondary antenna through the ground plane 4.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 printable coating
2 an antenna element
3 IC
4 ground plane
5 inlay
6 opening
7 spacer layer
8 printer-encoder antenna
9 RFID printer-encoder
10 impedance matching element
11 support substrate
12 bridge
13 RFID transponder web
14 gap
15 secondary antenna
16 perforation
100 RFID transponder
BOT bottom side
D distance
T transponder thickness
t bridge thickness
TOP top side
RF radio frequency
W width of the RFID transponder
w width of the bridge

The invention claimed is:

1. An RFID transponder, comprising
a printable surface,
an antenna element,
an IC,
a ground plane arranged under the antenna element,
the ground plane comprising one or more opening(s) through said ground plane for enabling near field communication through the ground plane.

2. The RFID transponder as claimed in claim 1, wherein a spacer layer made of a dielectric material is arranged between the antenna element and the ground plane.

3. The RFID transponder as claimed in 1, wherein the opening is a slot or groove.

4. The RFID transponder as claimed in 1, wherein the opening is a slot or groove.

5. The RFID transponder as claimed in 1, wherein the opening has a shape of circle, ellipse or polygon.

6. The RFID transponder as claimed in 1, wherein the opening has a shape of circle, ellipse or polygon.

7. The RFID transponder as claimed in claim 1, wherein at least one of said opening(s) is arranged under an impedance matching element arranged in the antenna element.

8. The RFID transponder as claimed in claim 1, wherein at least one of said opening(s) is arranged under a radiating element arranged in the antenna element.

9. The RFID transponder as claimed in claim 1, comprising a secondary antenna, wherein the one or more opening(s) through the ground plane are arranged for enabling near field communication of the secondary antenna through the ground plane.

10. The RFID transponder as claimed in claim 1, comprising a secondary antenna, wherein the one or more opening(s) through the ground plane are arranged for enabling near field communication of the secondary antenna through the ground plane.

11. An RFID transponder web, comprising
a support substrate, and
a series of the RFID transponders arranged on said support substrate such that there is a distance (D) between two successive RFID transponders,
the transponder(s) having a transponder thickness (T),
and a bridge arranged between the successive RFID transponders, the bridge having a bridge thickness (t), the transponder thickness (T) and the bridge thickness (t) being equal or at least essentially equal, and wherein the bridge is excluded from completed RFID transponders separated from the RFID transponder web.

12. The RFID transponder web as claimed in claim 11, wherein the width (w) of the bridge is less than the width (W) of the RFID transponder.

13. The RFID transponder web as claimed in claim 11, wherein the bridge comprises a secondary antenna arranged for near field communication.

14. The RFID transponder web as claimed in claim 11, wherein the bridge comprises a ground plane, and one or more opening(s) through said ground plane for enabling near field communication of the secondary antenna through the ground plane.

* * * * *